United States Patent [19]

Kornylak

[11] Patent Number: 4,969,548
[45] Date of Patent: Nov. 13, 1990

[54] COMPRESSION SET LIMITING GRAVITY CONVEYOR

[75] Inventor: Andrew T. Kornylak, Hamilton, Ohio

[73] Assignee: Kornylak Corporation, Hamilton, Ohio

[21] Appl. No.: 187,037

[22] Filed: Apr. 27, 1988

[51] Int. Cl.⁵ .............................................. B65G 13/00
[52] U.S. Cl. ..................................... 193/35 R; 193/37
[58] Field of Search ................ 193/35 R, 37; 198/780

[56] References Cited

U.S. PATENT DOCUMENTS

| | | |
|---|---|---|
| 91,435 | 6/1869 | Greene . |
| 96,635 | 11/1869 | Thomson . |
| 96,636 | 11/1869 | Tibbles . |
| 895,621 | 8/1908 | Fawell . |
| 1,173,124 | 2/1916 | Schleicher . |
| 1,455,977 | 5/1923 | Wentz . |
| 1,541,410 | 6/1925 | Cowley . |
| 2,241,686 | 5/1941 | Ware . |
| 2,283,274 | 5/1942 | Martin . |
| 2,730,222 | 1/1956 | Klein . |
| 2,854,052 | 9/1958 | Smith et al. . |
| 2,914,811 | 12/1959 | Cole et al. . |
| 2,920,734 | 1/1960 | Heinrich . |
| 2,943,889 | 7/1960 | Woldring et al. . |
| 2,983,352 | 5/1961 | De Flora et al. . |
| 3,031,895 | 5/1962 | Kindig . |
| 3,053,368 | 9/1962 | Klahn . |
| 3,083,063 | 3/1963 | Alfsen . |
| 3,095,956 | 7/1963 | McGill . |
| 3,103,387 | 9/1963 | Saxenberg . |
| 3,252,556 | 5/1966 | Isacsson . |
| 3,275,124 | 9/1966 | Lutes et al. . |
| 3,374,877 | 3/1968 | Kornylak . |
| 3,374,878 | 3/1968 | Kornylak . |

(List continued on next page.)

FOREIGN PATENT DOCUMENTS

| | | |
|---|---|---|
| 203839 | 10/1956 | Australia . |
| 202436 | 12/1956 | Australia . |
| 288851 | 1/1967 | Australia . |
| 2105284 | 8/1971 | Fed. Rep. of Germany . |
| 15899 | 1/1910 | United Kingdom . |
| 1099549 | 1/1968 | United Kingdom . |
| 1197665 | 7/1970 | United Kingdom . |
| 1336761 | 11/1973 | United Kingdom . |
| 2023084 | 12/1979 | United Kingdom . |

OTHER PUBLICATIONS

Ball and Roller Bearings, Their Theory, Design & Application by Eschman, pp. 164, 165.

*Primary Examiner*—H. Grant Skaggs
*Assistant Examiner*—D. Glenn Dayoan
*Attorney, Agent, or Firm*—Fay, Sharpe, Beall, Fagan, Minnich & McKee

[57] ABSTRACT

An undriven gravity roller conveyor is disclosed in which a first plurality of idler conveyor rollers having a rigid outer annular wheel surface and an annular tire of an elastomeric material with an inner annular bearing surface of complementary shape, mounted on each rigid outer annular wheel surface, are arranged in successive rows for conveying loads of cargo. The elastomeric tires, as mounted on the wheel surfaces, have substantially equal radial thicknesses providing outer annular bearing surfaces with a first radial dimension and a first circumferential surface area, and are made of a material having an elastic limit by which each of the tires acquires a permanent deformation known as compression set when radially depressed. Support structure having rigid outer annular bearing surfaces concentric with and rotatable about corresponding axes of rotation with the elastomeric tires, have rigid outer annular bearing surfaces characterized by a second and lesser radial dimension and a second circumferential surface area not less than one-half of the first circumferential surface area, receive and directly engage concurrently with one or more of the tires disposed about the corresponding axes a load being simultaneously supported and conveyed by one or more of the tires before the elastomeric material is subjected to an amount of radial deformation which will result in an undesirable amount of compression set.

19 Claims, 7 Drawing Sheets

U.S. PATENT DOCUMENTS

| | | |
|---|---|---|
| 3,420,348 | 1/1969 | Caudell et al. . |
| 3,443,674 | 5/1969 | Kornylak . |
| 3,509,978 | 5/1970 | Bedford . |
| 3,586,142 | 6/1971 | Inwood . |
| 3,621,960 | 11/1971 | Kornylak . |
| 3,651,911 | 3/1972 | Kornylak . |
| 3,721,326 | 3/1973 | Bussienne . |
| 3,768,614 | 10/1973 | Tabler . |
| 3,771,206 | 11/1973 | Brown . |
| 3,771,833 | 11/1973 | Smith . |
| 3,843,202 | 10/1974 | Lacerte . |
| 3,857,473 | 12/1974 | Kornylak . |
| 3,895,844 | 7/1975 | Merbler . |
| 3,900,112 | 8/1975 | Azzi . |
| 3,988,045 | 10/1976 | Coutant . |
| 4,006,810 | 2/1977 | Kornylak . |
| 4,023,672 | 5/1977 | Haley . |
| 4,050,561 | 9/1977 | Seitz . |
| 4,067,428 | 1/1978 | Shuttleworth . |
| 4,110,882 | 9/1978 | Hodge et al. . |
| 4,119,190 | 12/1978 | Kornylak . |
| 4,178,664 | 12/1979 | McLoughlin . |
| 4,203,509 | 5/1980 | Thompson . |
| 4,205,740 | 6/1980 | Hammond . |
| 4,210,235 | 7/1980 | Johnson . |
| 4,218,098 | 8/1980 | Burton . |
| 4,244,413 | 1/1981 | Takahashi et al. . |
| 4,267,992 | 5/1981 | Harper, Sr. . |
| 4,311,226 | 1/1982 | Thompson et al. . |
| 4,379,503 | 4/1983 | Kornylak . |
| 4,448,296 | 5/1984 | Tabler . |
| 4,541,518 | 9/1985 | Palazzolo . |
| 4,549,592 | 10/1985 | Schroeder . |
| 4,681,203 | 7/1987 | Kornylak ..................... 193/35 R |

COMPRESSION SET LIMITING GRAVITY CONVEYOR

TECHNICAL FIELD

This invention relates to gravity-type roller conveyors and, more particularly, to conveyors using rollers with deformable tires and to the rollers and supporting structure of such conveyors.

BACKGROUND ART

Currently available gravity roller conveyors typically use a pair of structural members to support each row of load-bearing rollers. Such a structure necessitates tedious fabrication techniques to assure uniform spacing between all of the structural members throughout the length of the conveyor. It is often desirable in such systems to stagger the placement of successive rollers to reduce the gap over which a load is unsupported. Typically, staggering is achieved merely by adding one or more additional rows of rollers with their centers longitudinally offset from one another. Recent conveyor designs have incorporated rollers mounted on alternate sides between pairs of support structures; however, the need to accommodate the axles of successive rollers has restricted the ability of such designs to minimize the gap between successive rollers. To date, the only conveyor systems providing minimal gaps between successive rollers require an excessive number of structural supporting members. Such designs exacerbate the fabrication difficulties of maintaining a proper spacing between the structural supporting members.

To avoid the use of ballbearing type journals between the axles of conveyor rollers and the structural supporting members, some designs have used specially machined configurations of axles for retentively engaging apertures in the support members with various types of flanges, bushings and retainers. Other designs have used sleeve-type ballbearing assemblies interposed between the axles of the rollers and specially formed receptacles in the supporting structural members. Unique axles and specially formed receptacles both incur additional tooling and fabrication costs. Moreover, the often intricate interrelation between the specially formed receptacles and the unique axles or bearings tends to hinder the repair or replacement of damaged rollers, thereby unnecessarily contributing to the maintenance cost of such conveyor systems.

Often rollers used for conveyors are filled with deformable tires of various configurations and materials. A major difficulty with currently available conveyors using deformable tire conveyors (both gravity conveyors using hysteresis speed control tires and push-line conveyors using minimum hysteresis tires) however, arises from a tendency of the tires, particularly tires made of elastomeric materials, to develop a compression set when a cargo load is allowed to rest at one place. Compression set causes a flat spot on the periphery of tire, thereby causing subsequent resistance to rolling conveyance of a cargo load.

The choice of materials available in efforts to overcome the problem of compression set and rolling resistance is limited to materials exhibiting a low compression set, preferably less than fifteen percent (15%) when tested in accordance with ASTM method B for twenty-two hours at a temperature of 70 degrees Celcius. Unfortunately, this limitation on materials eliminates many deformable materials and elastomers exhibiting properties of desired hardness at required temperatures which would otherwise make those elastomers ideal. For example, urethane compounds having low compression sets have not been found to be suitable at temperature in ranges between 30 degrees F. to −20 degrees F., a temperature range invariably encountered by conveyors installed in freezers, because such materials tend to become too hard within such temperature ranges. Conversely, elastomers which remain soft enough (e.g., softer than 90 Shore A) tend to develop excessive compression set.

Another problem encountered by currently available conveyors using deformable tires in conveyors arises from the tendency of wood slats of pallets to compress when a cargo load is allowed to remain stationary, particularly where elastomeric tires extend above a narrow, rigid rim of a roller wheel. Often, enough indentation of the rim into the wood of a pallet's slat occurs to prevent free movement of the pallet. Moreover, high humidity seems to exacerbate this problem. Furthermore, softer woods are more susceptible to indentation and subsequent rolling resistance after having remained stationary while supported by currently available conveyors using rollers fitted with elastomeric tires.

STATEMENT OF INVENTION

Accordingly, it is one object of this invention to provide an improved conveyor for the movement of cargo.

It is another object to provide a conveyor having a minimal number of structural members.

It is still another object to provide a conveyor which costs less to fabricate.

It is yet another object to provide a conveyor which may be easily fabricated to precise tolerances.

It is still yet another object to provide a conveyor which is amenable to rapid replacement of its load-bearing rollers.

It is a further object to provide a conveyor in which the load-bearing rollers may be easily interchanged.

It is a still further object to provide a conveyor in which the spacing patterns between load-bearing rollers may be easily modified.

It is a still yet further object to provide a conveyor exhibiting a very close spacing between load-bearing rollers.

It is another object to provide a conveyor able to accommodate the movement of cargo borne in containers which have supporting surfaces and salts of narrow width engaging the load-bearing rollers of the conveyor.

It is yet another object to provide a conveyor having inexpensive load-bearing rollers exhibiting low friction characteristics.

It is still another object to provide a conveyor having improved elastomeric rollers.

It is still yet another object to provide a conveyor exhibiting a broader load-bearing surface area for supporting stationary and moving cargo.

It is an additional object to provide a conveyor which minimizes resistance of cargo to resumption of movement after a period of having remained stationary while supported by rollers fitted with elastomeric tires.

These and other objects are achieved with an undriven gravity roller conveyor having a plurality of idler conveyor rollers mounted for freely rotating about a plurality of axes of rotation serially arranged in successive rows along a conveying direction extending along the length of a conveyor support. A first plurality of the rollers along the length of the conveyor support have a rigid outer circumferential wheel surface and an annular tire of deformable resilient material mounted on each wheel and concentrically disposed about a corresponding one of the axes of the first plurality of rollers. The tires have inner annular surfaces complementary in shape to the rigid outer circumferential wheel surface, and substantially equal radial thicknesses providing an outer circumferential bearing surface characterized by a first radial dimension and a first circumferential surface area. The deformable material of the tires has an elastic limit by which each of the tires acquires a permanent deformation when radially depressed. The rollers in each row provide an annular support having a rigid outer circumferential bearing surface concentric with and rotatable about corresponding axes of rotation with the deformable tires. The rigid outer circumferential bearing surfaces have a second and lesser radial dimension and a second circumferential surface area not less than one-half of the first circumferential surface area, and receive and directly engage concurrently with one or more of the deformable tires disposed about corresponding axes of rotation, cargo loads being simultaneously supported and conveyed by one or more of the tires before the elastic limit of the resilient material is reached.

Additional objects are achieved with undriven gravity roller conveyors in which a plurality of discrete, elongate channel members are laterally spaced apart, in parallel on a base structure to form a plurality of columns. The separation between the side walls of neighboring channel members is equal to the separation between the opposite side walls of each of the channel members. Uniform open slots are formed along the distal edges of the parallel side walls of each channel member with equidistant spacing between successive slots along each edge. Corresponding slots in adjacent side walls are aligned to form parallel rows that are substantially perpendicular to the length of the columns. Rollers mounted on axles are positioned between the side walls with the axles being disposed within the slots.

Alternatively, such features as the depths, widths, or spacings between successive slots may be varied, either separately or in combination, along the length of the channel members to accept different sizes or arrangements of rollers at specific locations and thereby accommodate variations in cargo loading experienced at those locations.

BRIEF DESCRIPTION OF THE DRAWINGS

A more complete appreciation of these inventions and many of the attendant advantages thereof will be readily apparent as the same becomes better understood by reference to the following detailed description, in which like numbers indicate the same or similar components, and wherein.

DETAILED DESCRIPTION OF THE INVENTION

Figure 1:
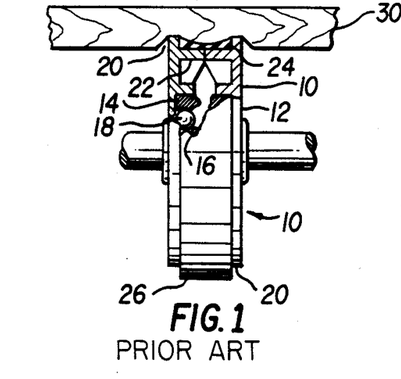
FIG. 1 is a front view illustrating the characteristics of one problem incurred by currently available conveyor rollers.

Referring now to the drawings, FIG. 1 illustrates one deficiency which was recognized by the inventor only after substantial efforts to develop the principles of this invention. In such conveyors, each roller includes a circular wheel 10 made of a non-deformable material such as steel with a cylindrical hub portion 12 into which is formed a conventional ballbearing assembly including an outer race 14, an inner race 16, and ballbearings 18. At their radial outer ends, wheels 10 form circular rims 20. A cylindrical flange 22 concentric with and about hub 12 is formed as an annular surface at a location spaced inwardly from the outer periphery of rims 20. A solid or cellular (foam) material, tire 24 of a deformable material such as an elastomeric is mounted on the outer periphery of the roller wheel formed by cylindrical flange 22. Tire 24 is an integrally formed member having an inner diameter substantially equal to that of the outer diameter of cylindrical flange 22. Tire 24 may fit the periphery of the cylinder formed by flange 22 snugly or even loosely if so desired. The radial thickness dimension of tire 24 is such that its outer circumferential bearing surface extends radially outwardly beyond rims 20 when tire 24 is in a relaxed state, that is, while tire 24 is not supporting any cargo or other loading on the outer circumferential bearing surface 26 of the tire which may tend to compress tire 24.

The material of the tire may be, as is explained in U.S. Pat. No. 4,006,810, similar to that described in U.S. Pat. No. 3,443,674, although the properties of hysteresis hardness, temperature stability, solvent, and chemical resistance may be varied in accordance with the load and environment in which the tire is to be used. It is desirable that the material from which solid tire 24 is made be of such nature that tire 24 does not retain a deformity, such as a "compression set" before a load such as a slat 30 of a cargo pallet reaches rims 20 of rollers 10.

As shown in FIG. 1, a problem frequently arises in currently available conveyors using deformable tires when a load has been allowed to remain stationary while resting upon outer circumferential bearing surface 26. The problem occurs because narrow pallet slats 30 tend to rest upon either one or only a few rollers 10, thereby compressing tires 24 until slats 30 rest upon rims 20. The load bearing surface area of roller 10 is limited by the narrow axial width of rims 20 in comparison to the axial width of now compressed tire 24; consequently, supplementing the load bearing surface area provided by compressed tire 24 with the load bearing surface area of narrow rims 20 only marginally enhances the net load bearing area (or, "footprint") of roller 10 available for supporting the stationary cargo load. This allows the surface area of rims 20 to indent slat 30. Particularly prounounced indentation occurs with wooden slats, especially slats made of softer woods. The degree of indentation seems to be exacerbated by the presence of high humidity, Indentation consequently resists free movement of a pallet along the conveyor, thereby frequently necessitating the application of force to cause a pallet to resume forward movement along a conveyor after having remained stationary for a short period of time.

Currently available conveyors using rollers with rigid, non-deformable outer circumferential bearing surfaces, such as "skate wheels", similarly cause enough indentation on the skate wheel into a wood slat to prevent free movement of a pallet.

Figure 2:
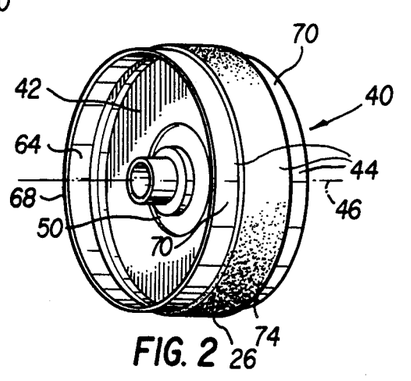
FIG. 2 is an isometric view of an embodiment of an undriven gravity roller according to the principles of the present invention.

Turning now to FIG. 2, a roller 40 containing a central wheel subassembly 42 and an outer annular compound tire subassembly 44 concentrically and coaxially disposed around wheel subassembly 42. Subassembly 42 is constructed of two separate like parts which are arranged as mirror images of one another and attached together in any desired manner, including welding. Each of the two parts of portion 42 includes a circular wheel half which would be obtained if a wheel were cut diametrically to axis 46 midway between flanges 48, as may be more clearly shown in FIG. 3.

Figures 3, 4, 5:
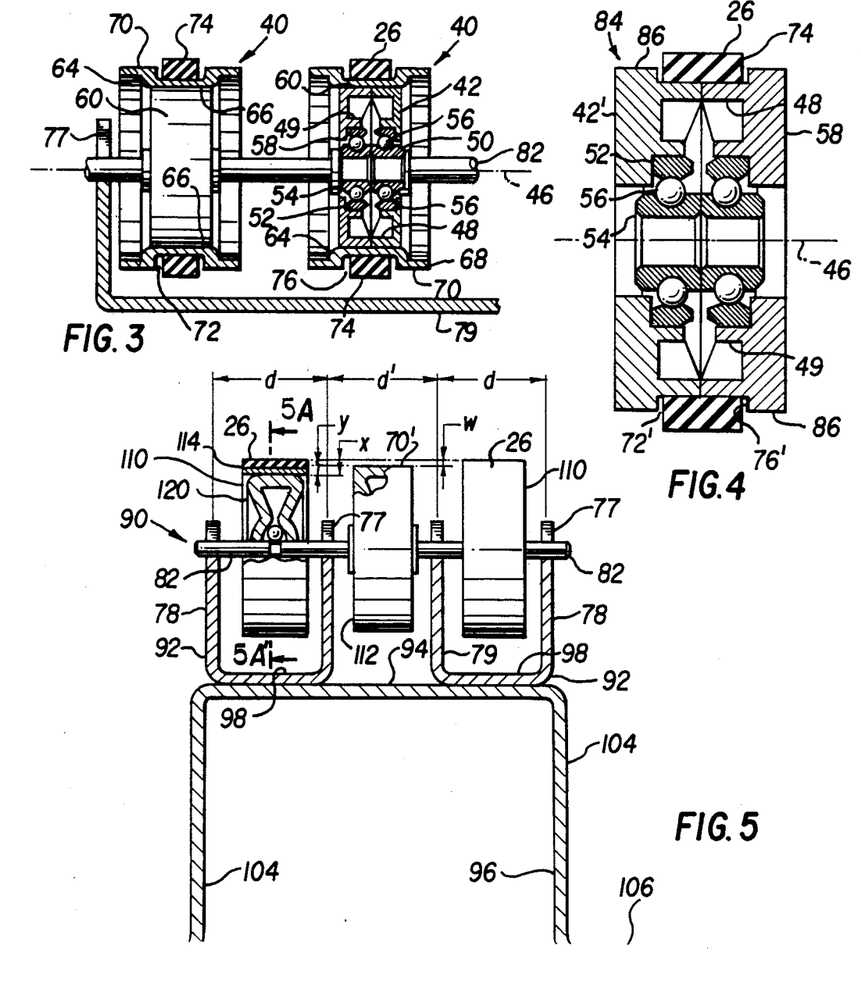
FIG. 3 is a front view illustrating a section of an undriven gravity roller conveyor according to the principles of the present invention.
FIG. 4 is a front cross-sectional view of an alternative embodiment of an undriven gravity roller according to the principles of the present invention.
FIG. 5 is a front partial cross-sectional view of an alternative embodiment of an undriven gravity roller conveyor according to the principles of the present invention.

Each half of subassembly 42 may include a cylindrical hub 50 as shown in cross-sectional detail in FIG. 3. Fitted within cylindrical hub 50 of each half is a conventional ballbearing assembly, which may include an outer race 52, an inner race 54, and ballbearings 56. When the ballbearing assembly is mounted within hub 50 with the outer periphery of outer race 52 in firm contact with the inner periphery of hub 50 and one side abutting the inner surface of wall 58 of portion 42, the end of inner race 54 furthest from wall 58 terminates in the plane of the free end of flange 48. The opening provided by circular wall 58 accommodates a portion of the inner race 54 when the assembly is mounted within hub 50. The halves of central wheel subassembly 42 may be fabricated of metal or plastic, and assembled together by axially aligning the two halves, with the free ends of flanges 48 in abutting relationship. The free ends of flanges 48 may then be joined together by such well-known techniques as, for example, ultrasonic welding.

After securing the two halves together, subassembly 42 forms a cylinder using abutting cylindrical flanges 48 to provide an outer circumferential surface 60.

Compound tire assembly 44 is constructed from a cylindrical rigid flanged tire 64 made of a generally non-deformable material such as metal or a plastic exhibiting a minimal degree of elasticity. Flanged tire 64 may include an inner annular member having an inner peripheral surface 66 conforming to the exterior dimensions of outer circumferential surface 60, albeit with a slightly greater axial width. The opposite axial ends of the annular member are radially recessed from the inner circumferences of member 60 to form a pair of oppositely disposed flanges 68 providing outer circumferential rigid bearing surfaces 70.

A central circumferential region along the outer surface of the rigid tire 64 of compound tire subassembly 44 may be machined to provide a central circumferential recess 72 for accommodating a deformable tire 74 concentrically disposed about rigid tire 64, within recess 72. Deformable tire 74 may be solid and made of a resilient and deformable material such as an elastomeric. Deformable tire 74 is mounted on the outer periphery of circumferential recess 72, axially disposed between opposed side walls 76 of recess 72.

The material of deformable tire 74 may, for example, be made of an elastomer which remains softer than 90 Shore A. The axial width of tire 74 may be made somewhat less than the distance between side walls 76, thereby enabling recess 72 to fully accommodate the volume of deformable tire 74 during compression by a cargo load.

Compound tire subassembly 44 may be mounted on wheel subassembly 42 by a force fit. To assure a force fit, however, the inner diameter along circumferential surface 66 of flanged tire 64 should be less than the diameter of outer circumferential surface 60 of central bearing subassembly 42. With a force fit construction between central bearing subassembly 42 and compound tire 44, the fact that circumferential surface 60 has a greater diameter than circumferential surface 66 when subassemblies 42 and 44 are at the same environmental conditions and temperature, assures that the only means holding compound tire subassembly 44 on bearing subassembly 42 is frictional engagement between outer surface 60 and inner circumferential surface 66, as caused by the inherent resiliency of the subassemblies which produces radial forces perpendicular to their engaging surfaces. Consequently, compound tire subassembly 44 will be in tension while bearing subassembly 42 will be in compression due to the resulting interference fit after assembly.

When subassemblies 42, 44 have been joined together, as by an interference fit, roller wheel 40 may be mounted upon a shaft 82 coaxially disposed along central axis 46 of wheel 40, as is shown in FIG. 3, either singly or with one or more roller wheels. The ends of shaft 82 may then be placed within open slots 77 extending from the upper, or distal, ends of opposite side walls 78 of a supporting component such as a single track rail 79, thereby forming one row of a succession of rows defining a column of roller wheels extending along the length of supporting rail 79.

Turning now to FIG. 4, a front cross-sectional view of an alternative embodiment of an undriven gravity roller wheel 84 constructed with a central bearing portion subassembly 42' is shown. Subassembly 42', as shown in FIG. 4, differs from subassembly 42 of FIG. 3 primarily in the greater axial width of annular walls 58 and in the extension of walls 58 radially outwards of axis 48 to provide at the outer radial ends of walls 58 a pair of outer circumferential bearing surfaces 86.

Bearing subassembly 42' concludes in each half outer cylindrical flanges 48 and inner hub flanges 49 which, when bearing subassembly halves 42' are joined together, may contain outer race 52, inner race 54, and ballbearings 56, as previously explained herein.

The outer circumferential surfaces of flanges 48 are radially disposed inwardly from outer circumferential bearing surfaces 86 to provide a central circumferential recess 72'. A deformable solid tire 74 may be mounted within recess 72', between opposite side walls 76', to rest symmetrically and coaxially about bearing subassembly 42'.

In the roller assemblies shown in FIGS. 2, 3 and 4, deformable tires 26 are disposed between a pair of circumferential bearing surfaces 70, 86, respectively, and have sufficient radial thickness to extend radially outwards from surfaces 70, 86. The axial distances between side walls 76, 76' may be made greater than the axial width of deformable tire 26, thereby enabling recesses 72, 72' to accommodate the volume of deformable tire 26 during compression. The outer diameter of bearing surfaces 70, 86 are selected in comparison to the outer diameter of bearing surface 26 to assure that during compression of deformable tire 74, surfaces 70 and 86 will receive and directly engage concurrently with bearing surface 26 a cargo load being simultaneously supported and conveyed on tire 74 before the elastic limit of the elastomeric material of tire 74 is reached. Consequently, as tire 74 is compressed into recess 72 by a cargo load, both surfaces either 26, 70 or 26, 86 concurrently engage and directly support the cargo, thereby advantageously supplementing the footprint of deformable tire 74 with the areas of bearing surfaces 70 or 86. This assures that sufficient surfaces area of a conveyor roller 40, 84 is available to engage and support both moving and stationary cargo, thus minimizing or eliminating indentation of the bearing surfaces into such cargo's surfaces engaged as the undersides of wooden slats. These features are maximized if the axial widths of outer circumferential bearing surfaces 70, 86 are constructed to provide not less than one-half of the surface area of circumferential bearing surface 26 of deformable tire 74. With such construction, tires 74 may be made with elastomers which have a hardness not greater than 90 Shore A.

FIGS. 5, 6, 7 and 8 show a section of a multi-track undriven gravity-type conveyor rail 90 which is constructed with a pair of elongate channel member 92 of any desired length affixed in a spaced part, parallel relation to the outer surface of a web 94 of a base structure 96. Each channel member 92 has a pair of opposite side walls 78 extending in parallel along the length of section 90. Connecting sides 98 rigidly join and maintain opposite side walls 78 in the parallel fixed, spaced apart relation.

A plurality of open slots 77 are formed along the unjoined upper edges of each side wall 78. Slots 77 are substantially identical and equidistantly spaced along the upper or unjoined edges of side walls 78. Slots 22 are aligned in parallel columns which are substantially perpendicular to the length of multi-track rail 90.

Base structure 96 can itself be constructed as a channel or C-shape with a pair of substantially parallel flange walls 104 disposed along opposite sides of web 94 and extending downwardly away from connecting sides 98 of channel member 92. The lowermost ends of flanges walls 104 are bent at right angles to the surfaces of flange walls 104 to provide a pair of feet 106. The disposition of flange walls 104 and feet 106 extending in an opposite direction from side walls 78 endows multi-track rail section 90 with enhanced rigidity, thereby enabling a conveyor in which rail section 90 is incorporated to handle heavier cargo loads without restoring to use of channel members 92 having stronger material characteristics.

FIG. 5 provides a cross-sectional end view to show the detailed structural aspects of the embodiment of a multi-track rail section 90. The pair of channel members 92 shown provide four side walls 78 accommodating two parallel columns of rollers 110 having deformable solid tires 74 providing outer circumferential bearing surfaces 26 around their circumferential periphery, aligned in rows with one intermediate column of rollers 112 having non-deformable outer circumferential bearing surfaces 70 prime. As shown, connecting sides 98 rigidly join and maintain opposite side walls 78 in their fixed, spaced-apart relation. The separation d' between side walls 78 of neighboring channel members 92 is equal to the separation, d between opposite side walls 78 of both channel member 92. The rollers 112 providing non-deformable circumferential bearing surfaces 70 prime may be conventional versions of standard ball bearing skate wheels with axle 82 prime pressed through the center of the wheel subassembly.

Figure 5A:
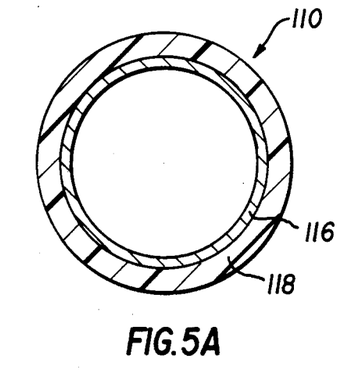
FIG. 5A is a cross-sectional view of a tire subassembly taken in a place along line 5A—5A' in FIG. 5.
Figure 6:
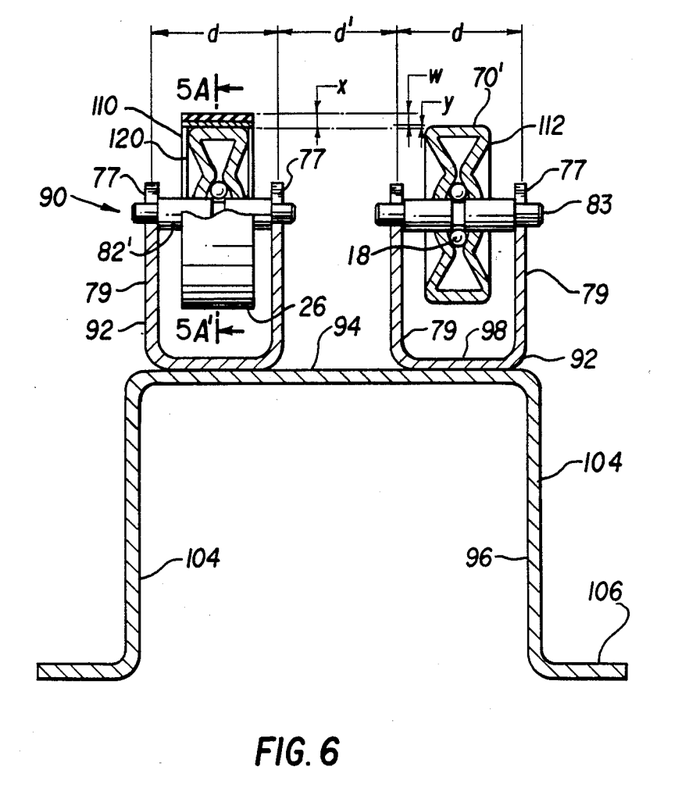
FIG. 6 is a front partially cross-sectional view of an alternative embodiment of an undriven gravity roller conveyor according to the principles of the present invention.

In FIGS. 5 and 6, rollers 110 differ from rollers 112 in that the former include tire subassemblies having a cylindrical rim 116 with an inner cylindrical surface and an outer cylindrical surface. As shown in FIG. 5A, a cross-sectional view taken along line 5A—5A' in FIGS. 5 and 6, a cylindrical deformable tire 118 made of a material such as an elastomer, has an inner cylindrical surface bonded to the outer cylindrical surface of rim 116. The bonding may be by means of self-adhesion, vulcanizing, application of adhesives, or the application of solvents. In any event, tire 118 is permanently bonded to the outer surface of rim 116 to prevent relative rotation between tire and rim. Deformable tire 118 may have its hardness, elasticity and hysteresis properties chosen according to its purpose and intended environment and to conform with the cargo loads which it will be expected to support. Rim 116 of tire assembly 114 may be constructed of a material specifically suited for its purpose without compromise of the needs of the wheel subassembly. For example, rim 116 may be constructed of steel, plated steel, aluminum, brass or even a synthetic resin or plastic material. A plurality of such tire subassemblies may be stockpiled with many different types being stockpiled in accordance with the above characteristics that may be desired.

Referring to FIGS. 5 and 6, rollers 110 are assembled with an "interference fit" between the wheel subassembly formed by currently available skate wheel 110 and tire subassemblies 114. As used herein, "interference fit" means that rim 116 of an unassembled tire subassembly 114 has an internal diameter less than the external diameter of the non-deformable outer circumferential bearing surface 70' that it will engage when assembled, while all other conditions such as temperature, are equal and that as assembled the only securement between surface 70' and the inner circumferential surface of rim 116 will be frictional forces of the peripherally engaging surfaces that are resiliently and radially pressed together by the inherent resiliency of the materials.

The assembly is by elastic deformation of the materials through such assembly processes are pre-stressing of either the inner or outer part, or both, by heat deferential (for example, a shrink fit), mechanical flexing, elastic joining or snap fit or by a driven force fit. This frictional engagement alone will be sufficient to maintain the assembly unitary for the purposes of conveying without relative movement between rim 112 and outer circumferential surface 70'.

As shown in FIGS. 5 and 6, the outer diameter of surface 70' of roller 112 is greater than the outer diameter of wheel subassembly 120 by a difference, y, while the outer diameter of deformable tire 26 (after tire subassembly 114 is mounted in an interference fit on wheel subassembly 120) is greater than the outer diameter of bearing surface 70' by a quantity w. As may be seen in FIGS. 5 and 6, the diameter of bearing surface 70 of rollers 112 is greater than the outer circumferential surface of wheel subassemblies 120 (after assembly) by a value x, where:

$$x - y = w \tag{1}$$

The difference w, is selected to assure that outer annular bearing surface 70' has a lesser radial dimension than outer circumferential bearing surface 26 of roller 110, whereby bearing surface 70' will receive and directly engagingly support, concurrently with bearing surface 26, a cargo load being simultaneously supported and conveyed by rollers 110 before the predetermined limit of deflection compression set of the material of deformable tires 118 is reached. During design, the maximum deflection desired to be tolerated (e.g., 30% of the relaxed thickness of a tire) is established as the limit of deflection compression. In design, compression set is preferably limited to ten percent as determined by Method B of an ASTM test; occasionally however, it is necessary with some of the materials used in tires to accept up to twenty percent compression set, as determined by the same test. The axial width of rollers 112 is sized to assure that there circumferential load-bearing surface areas 70' is not less than one-half of circumferential load-bearing surface areas 26 of rollers 110.

In the embodiment shown in FIG. 5, roller 112 is mounted co-axially with rollers 110 on a single shaft 82 extending through all four slots 77 in channel members 78 to form a single row. In the embodiment of FIG. 6, however, rollers 110 and 112 are co-axially mounted and disposed within different channel members 92, albeit on discrete axles 82'. Modifications of the embodiment of FIGS. 5 and 6 may be formed with different combinations of channel members 92 to provide various arrangements of rollers 112 with tires of deformable material and rollers 112 providing a rigid, non-deformable load-bearing surface 70' of a lesser diameter to receive a cargo load before the elastic limit of the material of the deformable tires is reached.

In the embodiments of FIGS. 5 and 6, the outer diameter of wheel subassemblies 120 is greater than the inner diameter of rim 116 in deformable tire subassemblies 114 when the subassemblies are separate from each other and under the same environmental conditions, for example, at the same temperature. The wheel subassemblies may be kept in inventory as common to all tire subassemblies, that is all wheel subassemblies will be identical to each other and common to a plurality of different types of tire subassemblies. Also, it is possible to provide a plurality of different wheel subassemblies, for example, that differ in load-bearing capacities and shaft configurations which, in turn, may be interchangeable with a plurality of different types of tire subassemblies. The critical feature is that all of the tire subassemblies have substantially the same innerdiameter, that all of the wheel subassemblies have substantially the same outer diameter, and that the outer diameter of the wheel subassemblies be larger than the inner diameter of the tire subassemblies, to provide for an interference fit between the subassemblies. An interference fit is the most economic and convenient method for mounting the tire subassembly upon the wheel subassembly.

The assembly process may also be formed by cooling the wheel subassembly and, or, heating the tire subassembly prior to mounting so that after assembly, the two subassemblies may reach the same temperature and provide for an interference fit. Also, a suitable press may be used for the assembly of a force fit. In any event, the only means holding the tire subassembly onto the wheel subassembly is frictional engagement between the outer surface of wheel subassembly 120 and the inner surface of rim 116 as is caused by the inherent resiliency of the subassemblies which produces radial forces perpendicular to the engaging surfaces; that is, the tire subassembly will be in tension and the wheel subassembly will be in compression as a result of an interference fit, when assembled.

In general, a limiting factor of the load-carrying capacity of currently available conveyors has been the capacity of deformable tires because anti-friction bearings have tended to have load-carrying capacities many times greater than the tires. With the presently disclosed inventions, when it is desired to have a high load capacity roller, a tire subassembly may be selected of a far greater axially measured width than the wheel subassembly to provide a roller in which the load-carrying capacity of the deformable tire is greater, or even approximately equal to, the load-carrying capacity of the bearings. This is in constrast to the usual construction wherein the width of the tire subassembly (not shown) is equal to or less than the width of the wheel subassembly.

In the embodiment of FIG. 6, shoulders 83 formed in axles 82' inwardly from the end portions of the axles, rest upon the facing surface of side walls 78. Alternatively, wheel subassemblies 120 and rollers 112 may be replaced with types having a solid inner race with projecting journals disposable within slots 77.

Figure 7:
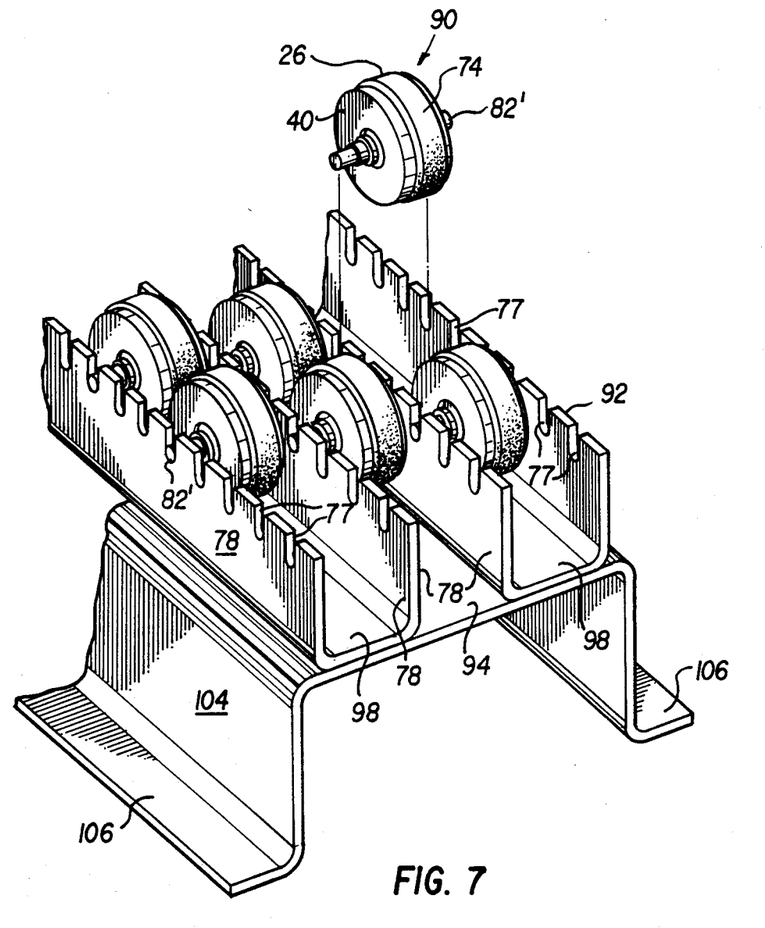
FIG. 7 is an isometric view of an alternative embodiment of an undriven gravity roller conveyor according to the principles of the present invention.

Referring now to FIG. 7, a section of a multi-track undriven gravity-type conveyor 90 is shown as constructed with a pair of elongate channel members 92 of any desired length affixed in a spaced-apart, parallel relation to the outer surface of web 94 of base structure 96. Each channel member 92 has a pair of opposite side walls 78 extending in parallel along the length of section 90. Connecting sides 98 rigidly join and maintain opposite side walls 78 in their fixed spaced apart relation.

A plurality of rollers 40 having opposite end portions of their axles 82' extending from opposite sides, are disposed in columns between opposite side walls 78 of each channel member 92 and between adjacent side walls 78 of each pair of neighboring channel members 92. The end portions of axles 82' are disposed within aligned pairs of slot 77, thereby forming three columns of staggered rollers 40 with each column extending over substantially the entire length of multi-rack rail section 90. In this manner, it can be seen that two discreet members 92, when spaced apart so that the least distance between their closest side walls 78 is equal to the spacing between opposite side walls 78 of each channel member 92, provide three adjacent columns of unconnected rollers for independently supporting a cargo load such as a slat of a pallet.

Figure 8:
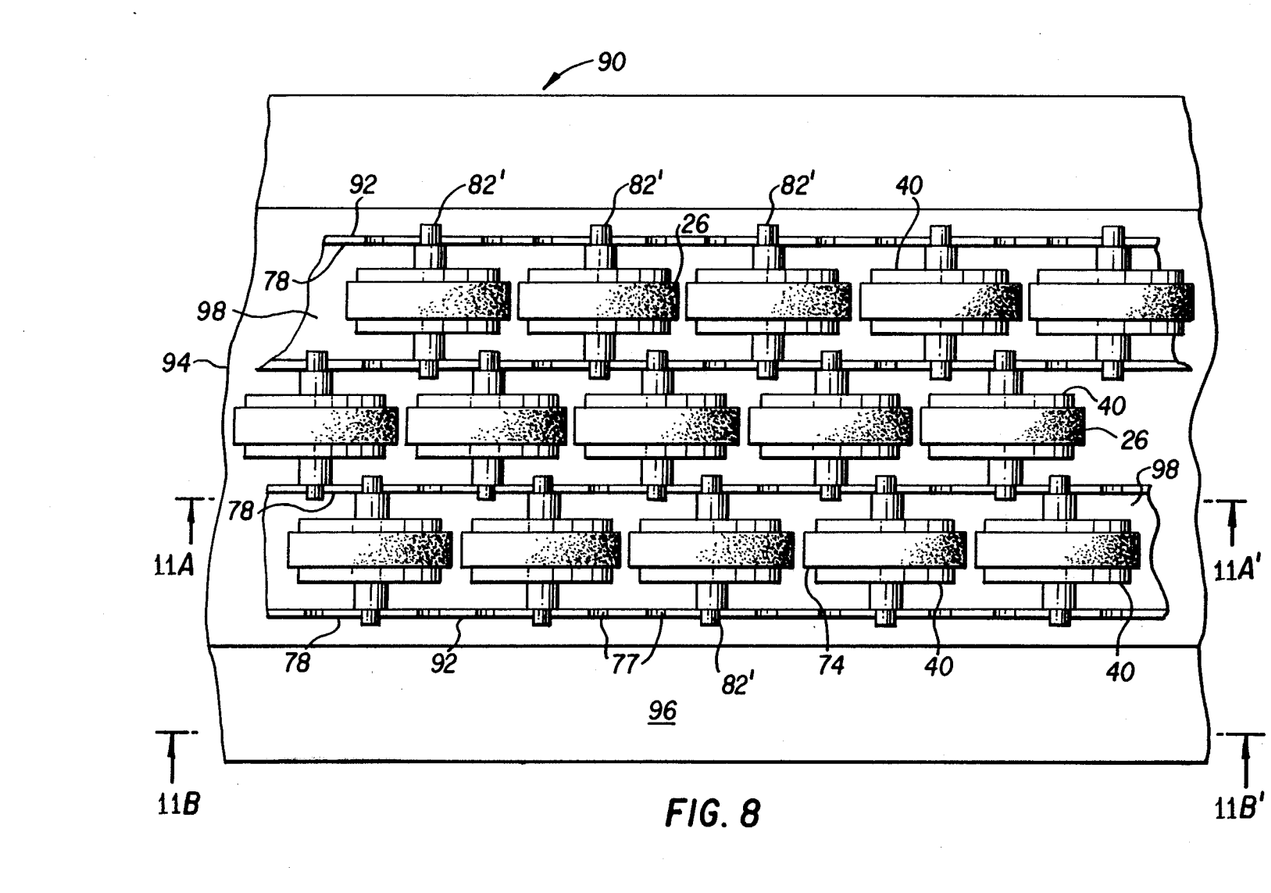
FIG. 8 is a top view of a conveyor of the type shown in FIG. 7.

As shown in FIGS. 7 and 8, this arrangement of channel members 92 having a plurality of substantially identical slots 77 aligned in rows perpendicular to the length of rail section 90, provides a configuration in which the end portions of axles 82' are disposed within every third pair of slots along each column formed by side wall 78. This arrangement allows the spacing between rollers in each column to be independently determined and tailored to a particular conveyor application. It may be seen therefore, that three discreet, spaced-apart channel members 92 will provide five columns of load-bearing rollers while four discreet, spaced-apart channel members 92 will provide seven columns of rollers. In general, n discreet channel members 92 arranged in parallel with a separation between the side walls of neighboring channel members being equal to the separation between the opposite side walls of each channel member, and with corresponding slot 77, in at least the closest of the opposite side wall of neighboring channel members 92, aligned in parallel rolls substantially perpendicular to the length of the columns, provide two n−1 columns for the placement of load-bearing rollers 40.

Figure 9A:
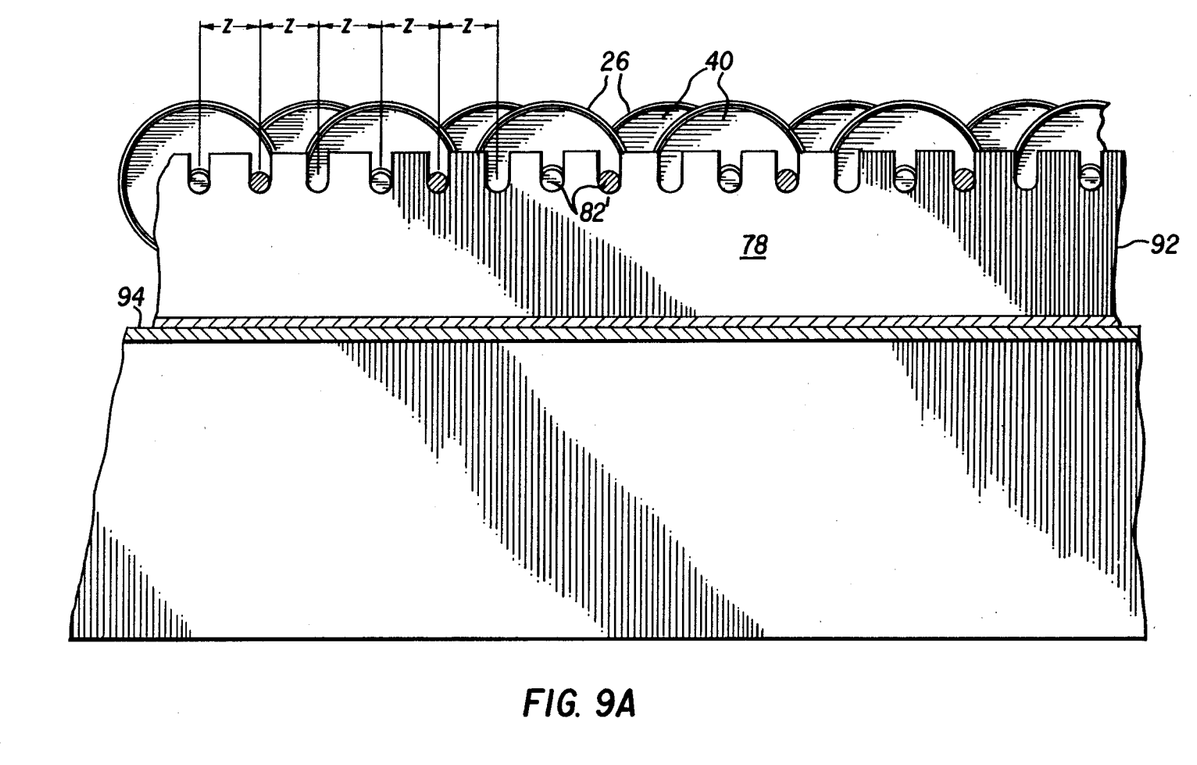
FIGS. 9A and 9B are side cross-sectional views taken along lines 11A—11A' and 11B—11B' in FIG. 8.
Figure 9B:
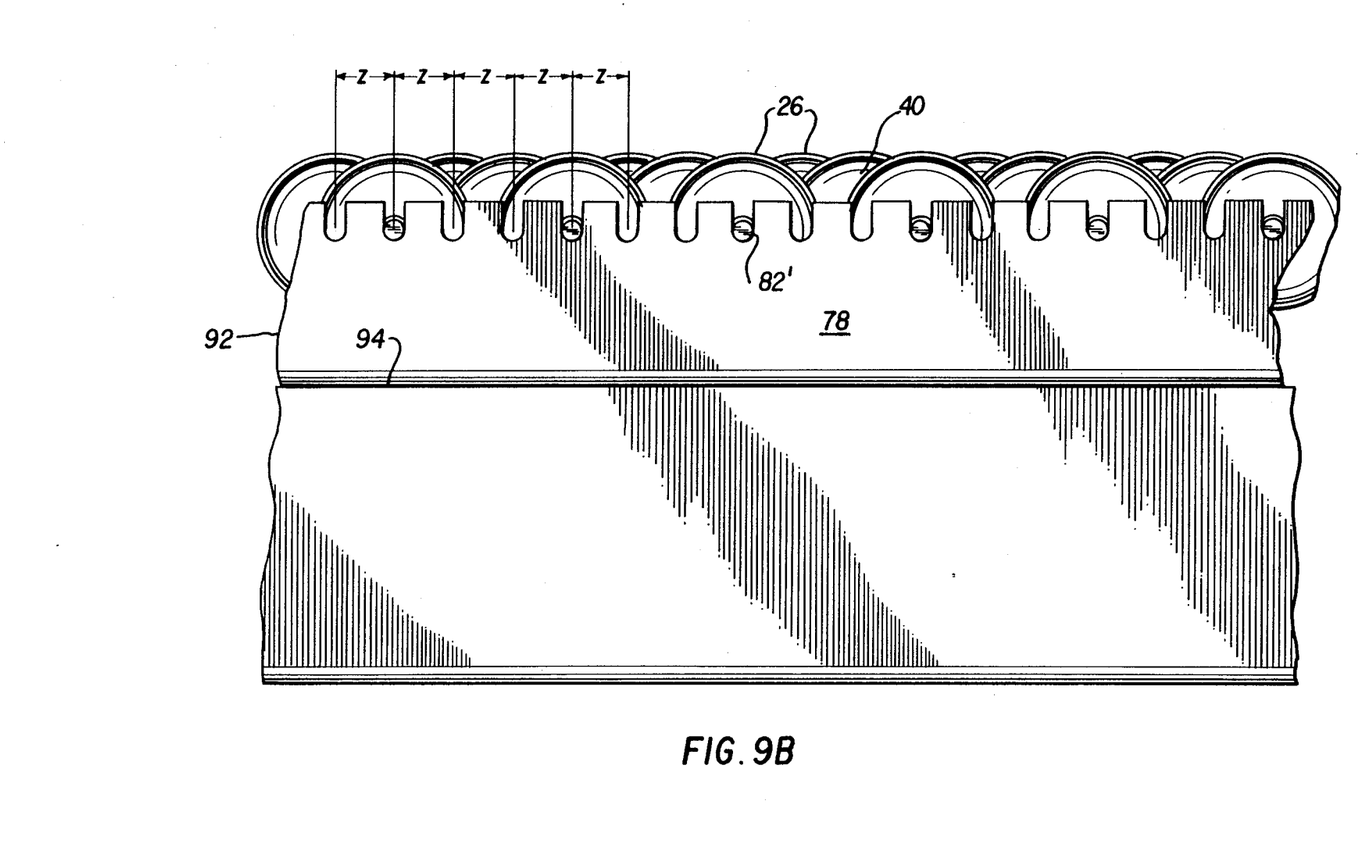

The spacing between slots 77 is best shown by FIGS. 9A and 9B, side cross-sectional views taken along lines 11A 11A' and 11B—11B' in FIG. 8. As shown, the end portions of axles 82' in a column of rollers 40 are disposed within every third slot along the length of the column. In this arrangement, the center-to-center spacing z between successive slots 77 along each unjoined edge of side walls 78 may be made extremely small. As shown, the center-to-center spacing z is substantially less than one-half the exterior diameter of deformable tire 74 of roller 40. Practical considerations such as the occasional presence of trash or debris upon rail section 90 during operation of a conveyor dictates that a small clearance be maintained between each successive pair of rollers in a column. In effect therefore, the multi-rail configuration disclosed provides a spacing between successive slots 77 which is substantially equal to the quotion of the sum of the exterior diameter of one of the rollers and the clearance between two successive rollers in the column, divided by the number of columns, two n−1.

In a typical configuration with two channel members, using rollers 40 having nominal two-inch external diameters, mounted to provide approximately one thirty-second of an inch clearance between successive rollers, the sum of the exterior diameter of one roller 40 and the clearance between two successive rollers will equal two inches. This will allow for 0.657 inch center-to-center spacing between successive slots. Alternatively, a 0.8 inch spacing between successive slots will accommodate 2.25 inch diameter rollers. It may be seen therefore, that this configuration accommodates a spacing between slots which nearly approaches one-third of the exterior diameter of the rollers. The practical advantages of this close spacing provided between successive slots 77 lie in both the ease with which a roller spacing pattern may be changed and in the ability of a conveyor with close spacing between successive rollers to accommodate, due to the staggered alignment of neighboring columns, movement without tipping, of cargo borne in containers having load-bearing members of narrow width engaging the rollers.

Figure 10:
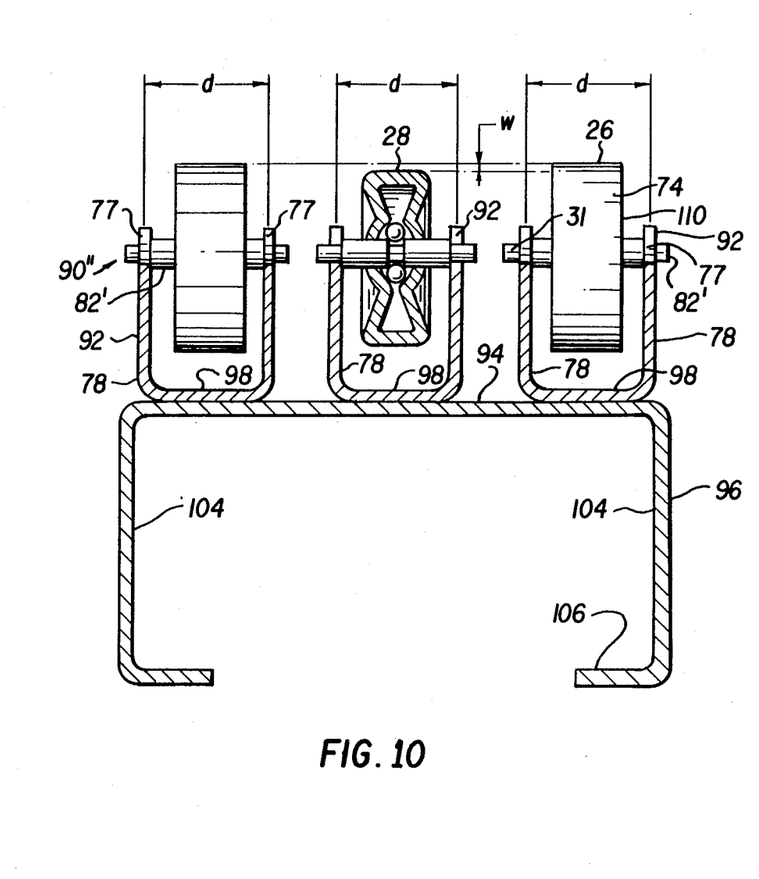
FIG. 10 is an end cross-sectional view of an embodiment according to some of the principles disclosed herein.

FIG. 10 shows a section 90" of a multi-track undriven gravity-type conveyor embodying several of the principles disclosed herein. In this embodiment, a plurality of channel members 92 of any desired lengths are attached, in a spaced-apart parallel relation to the outer surface of a web 94 of base structure 96. Each channel member 92 has a pair of opposite side wall 78 extending in parallel relation along the length of section 90" with intermediate webs 98 rigidly joining and maintaining each pair of side walls 78 in fixed, spaced-apart relation. Connecting sides 98 of each channel member 92 are attached to the outer surface of web 94. The feet 106 of flange walls 104 are inwardly directed to provide a base occupying minimal lateral space.

Sections 90 in FIGS. 5, 6 7 and 8, and 90' in FIG. 10 are formed with equidistant spacing between slots 77 along the length of side wall 78. In FIGS. 6, 7, 8 and 10, the end portion of axles of 82" along any column of rollers 110 and 112, or 40 respectively, are disposed within slots 77 in configurations adapted to particular load-bearing requirements. For example, and as is shown in FIGS. 7 and 8, the end portions of axles 82' in a column of rollers 40, may be disposed within every third slot along the earth length of the column. The center-to-center spacing between successive open slots 77 along each side wall 78 may be made extremely small. In a typical embodiment, the center-to-center spacing between successive slots 77 is substantially less than one-half of the exterior diameter of roller 40. Such spacing allows the end portions of axles 82' in a row of rollers 40 to be disposed within every third slot 77 along the length of a column, whereby the disposition of rollers 40 in the left, center and right rows shown in FIGS. 7 and 8 provides a staggered alignment of axles 82' between neighboring columns.

In an alternative to the embodiments shown in FIGS. 7 and 8, the spacing between successive slots along each channel member may be arranged to equal to sum of the exterior diameter of a roller 40 and a small clearance value. The staggered configuration of rollers can be achieved simply by incrementally shifting the channel members longitudinally relative to each other.

A plurality of open slots 77 are formed along the unjoined edges of each side wall 78. Slots 77 are substantially identical and equidistantly spaced along the upper or unjoined edges of side wall 78 and are aligned in parallel rows which are substantially perpendicular to the length of multi-track rail section 90.

It is apparent from the foregoing details that the present invention contemplates an improved conveyor in which the advantages of deformable tires are preserved while the difficulties attendant to the use of such tires are reduced, thereby allowing their use in a wide variety of conveyor rails providing different arrangements of load-bearing rollers for movement and live storage of cargo. By minimizing indentation of the rollers into the cargo, the disclosed inventions facilitate storage and re-starting of stationary cargo while preserving a degree of control over cargo acceleration and speed through use of hysteresis type elastomeric tire materials. Through their closer lower spacing, other embodiments disclosed provide increased load-carrying capacity while enabling gravity flow of cargo having narrow load-bearing surfaces. Examples of the types of cargo that may flow over a conveyor constructed according to the principles disclosed herein include pallets with very narrow slats and even pails and drums with bottom chines.

EXAMPLE 1

As an example of the effectiveness of the foregoing embodiments, a 2,500 pound load mounted on a commercially available hardwood grocery pallet was placed on a gravity roller conveyor made with two rails, each using a series of rollers 10 having tires 24 made of elastomeric materials exhibiting hardnesses of 80 Shore A at −10 degrees F. After the load had been allowed to rest and remain stationary for one-half of an hour at −10 degrees F., sufficient indentation of the rollers into the slats of the pallet occurred so that it became necessary to adjust the rails to provide a slope of 0.675 inches per foot before the load would resume movement under force of gravity. With this slope, the load accelerated to a speed of 140 feet per minute and continued to accelerate within a space of 20 feet. Such acceleration and concommitant high speed is, of course, unsafe in live storage conveyor applications.

EXAMPLE 2

When a gravity roller conveyor using the same number of rollers were separated by a column of rollers having non-deformable bearing surfaces 70' with outer diameters sized to limit the deflection of the elastomeric tires 74 of the remaining wheels to 0.075 inches was provided in a configuration with two multi-track rails as shown in FIG. 5, indentation was minimized and the slope required to cause the pallet to resume movement under influence of gravity was reduced to 0.550 inches per foot. Additionally, the speed of the pallet after resumption of movement under the force of gravity was stabilized at 20 feet per minute.

I claim:

1. A gravity undriven roller conveyor, comprising:
   a stationary rigid conveyor support;
   a plurality of idler conveyor rollers serially arranged in successive rows along a conveying direction extending along the length of said conveyor support;
   bearing means for freely rotatably mounting each of said conveyor rollers on said conveyor support with parallel axes of rotation, said axes being perpendicular to said conveying direction for supporting loads on said conveyor rollers and conveying loads along said conveying direction;
   a first plurality of said rollers along the length of said conveyor support having a rigid outer annular wheel surface, and an annular tire of an elastomeric material mounted on each rigid annular wheel surface and concentrically disposed about a corresponding one of said axes of said first plurality of rollers in each row;
   each of said tires having an inner annular bearing surface of complementary shape to said rigid outer annular wheel surface;
   said tires having substantially equal radial thicknesses providing a first outer annular bearing surface characterized by a first radial dimension and a first circumferential surface area;
   said elastomeric material of said tires having a deformation limit radial dimension at which each of said tires acquires excessive permanent set when radially depressed; and
   said rollers in each row providing support means having a rigid second outer annular bearing surface concentric with and rotatable about corresponding axes of rotation, said second outer annular bearing surface being characterized by a second and lesser radial dimension than said first radial dimension and a second circumferential surface area not less than one-half of said first circumferential surface area, for receiving and directly engaging concurrently with one or more of said tires disposed about said corresponding ones of said axes of load being simultaneously supported and conveyed by one or more of said tires before the deformation limit radial dimension of said elastomeric material is reached.

2. The gravity roller conveyor of claim 1, wherein each of said tires exhibits said first radial dimension when in an unloaded condition and a different and lesser radial dimension than said first radial dimension when the deformation limit of said elastomeric material is reached, said second radial dimension being greater than said deformation limit radial dimension.

3. The gravity roller conveyor of claim 1, wherein said support means comprises a pair of axially spaced flanges integrally forming part of and extending radially outwardly from axially opposed sides of each of said plurality of outer annular wheel surfaces on each of said first plurality of rollers.

4. The gravity roller conveyor of claim 1, wherein:
   said support means comprises a pair of axially spaced flanges integrally forming part of and extending radially outwardly from axially opposed sides of each of said plurality of outer annular wheel surfaces of each of said first plurality of rollers;
   said tires being freely mounted on each of said wheels for free axial and circumferential relative movement between said inner bearing surface and said outer annular wheel surface; and
   said flanges being of depths relative to the radial thickness of said tires to completely receive the elastomeric material of said tires and of axial widths to directly engage the load being conveyed, before said deformation limit of said elastomeric material is reached under radial compression by the load being conveyed.

5. The gravity roller conveyor of claim 1, wherein said rigid outer annular wheel surface comprises pairs of flanges integrally forming part of and extending radially outwardly from axially opposite sides of said annular wheel surface of each of said conveyor rollers and rims adjoining and extending axially from said flanges to directly engage the load being conveyed before said deformation limit radial dimension of said elastomeric material is reached.

6. The gravity roller conveyor of claim 1, wherein said support means comprises a second plurality of rollers with one of said second plurality of said rollers being disposed in each of said rows in spaced apart and substantially coaxial relation to one of said first plurality of rollers, said rigid second outer annular bearing surface additionally comprising said second plurality of rollers, said second plurality of rollers characterized by said second and lesser radial dimension and said second circumferential surface.

7. The gravity roller conveyor of claim 1, wherein:
   said support means comprises a second plurality of rollers with each of said second plurality of rollers additionally comprising said rigid second outer annular bearing surface, each of said second plurality of rollers characterized by said second and lesser radial dimension and said second circumferential surface; and
   a plurality of said conveyor rollers being arranged in each of said rows with one of said first plurality of rollers and one of said second plurality of rollers being disposed in spaced apart and substantially coaxial relation in each of said rows.

8. The gravity roller conveyor of claim 1, wherein:

said bearing means include a plurality of axles with each of said rollers being mounted on a different one of said axles;

said stationary rigid conveyor support includes a section providing a base and a plurality of discrete elongate channel members extending from said base in a laterally spaced apart, parallel relation forming a plurality of columns, each of said channel members having integral therewith a plurality of opposite side walls extending along the length of said columns and a connecting side rigidly joining and maintaining said opposite side walls in a fixed spaced apart relation with the separation between said opposite side walls being equal to the separation between neighboring channel members;

said plurality of opposite side walls in each of said channel members having a plurality of slots formed therein alignable with parallel rows having corresponding slots in at least the closest of the opposite side walls of a neighboring channel member, said parallel rows being substantially perpendicular to the length of said columns, said slots being open, substantially identical and equidistantly spaced on both sides and along an unjoined edge of each of said opposite side walls in each of said channel members; and said axles are disposable within said slots, both between said plurality of opposite side walls in each of said channel members and between adjacent side wall of neighboring pairs of said channel members with the axles of rollers in any two neighboring rows being disposable in different ones of said slots, whereby the separation between axles of rollers in said any two neighboring columns may be less than one-half of the exterior diameter of said rollers.

9. The gravity roller conveyor of claim 8 wherein said plurality of rollers are disposed between adjacent pair of said side walls, whereby n discrete channel members provide 2n−1 columns of said rollers.

10. The gravity roller conveyor of claim 9, wherein the spacing between successive slots along said unjoined edge of each side walls is less than one-half of the exterior diameter of said rollers.

11. The gravity roller conveyor of claim 10, wherein the spacing between successive slots along said unjoined edge of each side wall is substantially equal to the quotient of the sum of the exterior diameter of one of said rollers and the clearance between two successive rollers in a column divided by the number of said columns.

12. A gravity undriven roller conveyor, comprising:
a stationary rigid conveyor support;
a plurality of idler conveyor rollers;
said rollers each having a rigid outer annular wheel surface, and an annular tire of an elastomeric material mounted on and concentrically disposed about the rigid annular wheel surface;
each of said rollers having a pair of opposite axially spaced annular flanges integrally forming part of and extending radially outwardly from opposite sides of each of said plurality of outer annular wheel surfaces, said rollers being serially arranged in successive rows along a conveying direction extending along the length of said conveyor support;
each of said tires having an inner annular bearing surface of complementary shape to said rigid outer annular wheel surface;

said tires having substantially equal radial thicknesses providing a first outer annular bearing surface characterized by a first radial dimension and a first circumferential surface area;

said elastomeric material of said tires having a deformation limit at which said tires acquire excessive permanent set when radially depressed; and said axially spaced flanges providing a rigid second outer annular bearing surface concentric with the rigid annular wheel surface, said second outer annular bearing surface being characterized by a second and lesser radial dimension than said first radial dimension and a second circumferential surface area not less than one-half of said first circumferential surface area for receiving and directly engaging concurrently with one or more of said tires disposed about said corresponding ones of said axes a load tires disposed about said corresponding ones of said axes a load being simultaneously supported and conveyed by one or more of said tires before the deformation limit of said elastomeric material is reached.

13. The gravity roller conveyor of claim 12, wherein:
said tires are freely mounted on each said wheels for free axial and circumferential relative movement between said inner bearing surface and said outer annular wheel surface.

14. The gravity roller conveyor of claim 12, wherein:
said flanges extend radially outwardly from said outer annular wheel surfaces to provide depths relative to the radial thicknesses of said tires to completely receive the elastomeric material of said tires and of axial widths to directly engage the load being conveyed, before said deformation limit of said elastomeric material is reached under radial compression by the load being conveyed.

15. The gravity roller conveyor of claim 12, wherein said annular flanges integrally form part of and extend radially outwardly from axially opposed sides of said outer annular wheel surface of each of said conveyor rollers whereby said second outer annular bearing surface extends axially beyond said opposite sides of said outer annular wheel surfaces to directly engage the load being conveyed before said deformation limit of said elastomeric material is reached.

16. The gravity roller conveyor of claim 20, wherein:
said stationary rigid conveyor support includes a section providing a base and a plurality of discrete elongate channel members extending from said base in a laterally spaced apart, parallel relation forming a plurality of columns, each of said channel members having integral therewith a plurality of opposite side walls extending along the length of said columns and a connecting side rigidly joining and maintaining said opposite side walls in a fixed spaced apart relation with the separation between said opposite side walls being equal to the separation between neighboring channel members;

said plurality of opposite side walls in each of said channel members having a plurality of slots formed therein alignable with parallel rows having corresponding slots in at least the closest of the opposite side walls of a neighboring channel member, said parallel rows being substantially perpendicular to the length of said columns, said slots being open, substantially identical and equidistantly spaced on both sides and along an unjoined edge of each of said opposite side walls in each of said channel members; and said rollers having axles disposable within said slots, both between said plurality of opposite side walls in each of said channel members and between adjacent side walls of neighboring pairs of said channel members with the axles of rollers in any two neighboring rows being disposable in different ones of said slots, whereby the separation between axles of rollers in said any two neighboring columns may be less than one-half of the exterior diameter of said rollers.

17. The gravity roller conveyor of claim 16, wherein said plurality of rollers are disposed between adjacent pairs of said side walls, whereby n discrete channel members provide 2n−1 columns of said rollers.

18. The gravity roller conveyor of claim 16, wherein the spacing between successive slots along said unjoined edge of each side wall is less than one-half of the exterior diameter of said rollers.

19. The gravity roller conveyor of claim 18, wherein the spacing between successive slots along said unjoined edge of each side wall is substantially equal to the quotient of the sum of the exterior diameter of one of said rollers and the clearance between two successive rollers in a column divided by the number of said columns.

* * * * *